Nov. 24, 1942.   W. A. SCHRAK   2,303,233
RESILIENT SUSPENSION
Filed May 28, 1941
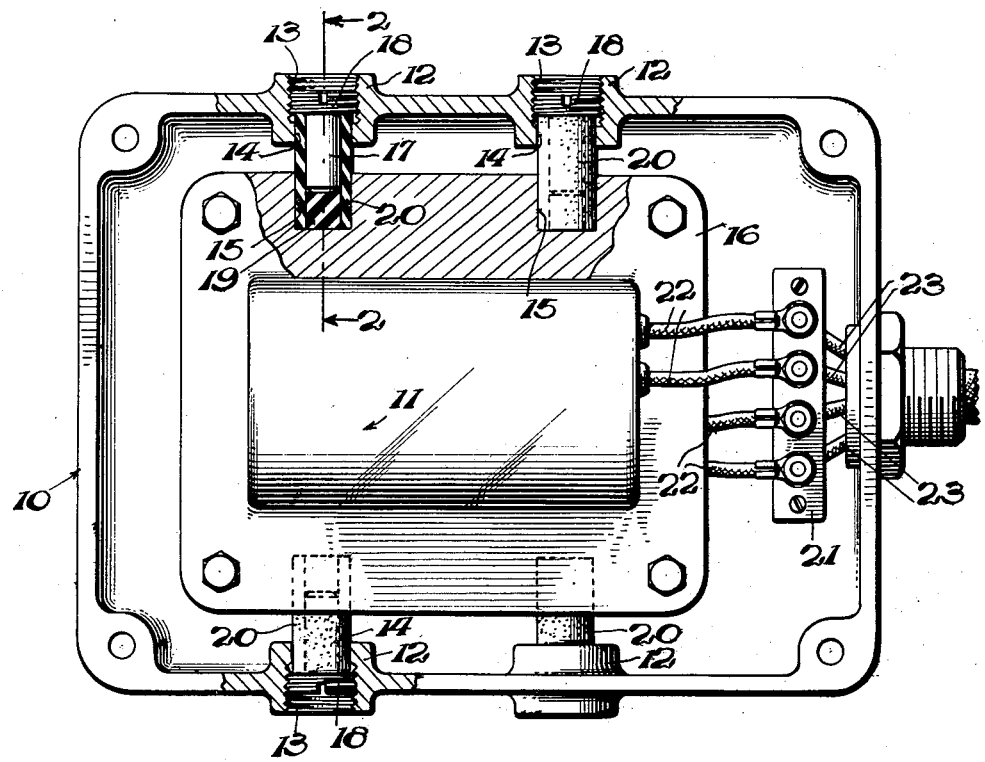
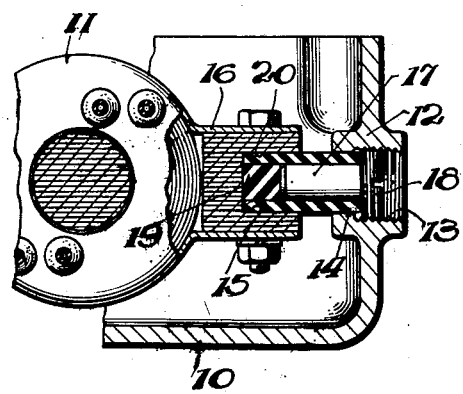
INVENTOR
William A. Schrak.
BY David F. Doody
ATTORNEY Patented Nov. 24, 1942

2,303,233

UNITED STATES PATENT OFFICE 2,303,233

RESILIENT SUSPENSION

William A. Schrak, East Orange, N. J., assignor to Bendix Aviation Corporation, South Bend, Ind., a corporation of Delaware Application May 28, 1941, Serial No. 395,695

3 Claims. (Cl. 248—358)

This invention relates to suspensions, and more particularly to that type of suspension in which mechanical vibration is damped.

An object of the present invention is the provision of a suspension in which the transmission of mechanical vibration from a base member to a suspended member is eliminated without the loss of mechanical strength in the suspension.

It is another object of the invention to provide a shock-proof suspending means for a mechanism wherein the resilience of the suspension may be adjusted at will.

Other objects will appear from a study of the following specification when made in conjunction with the attached drawing, throughout which like numerals designate like parts.

Fig. 1 is a plan view of one embodiment of the present invention, certain portions thereof being shown in section; and Fig. 2 is a fragmentary elevational view, with a portion in cross-section, the sectional plane being in the line 2—2 of Fig. 1.

It is common to suspend a delicate unit, such as a radio receiver, voltage regulator, etc. in such a manner in aircraft, that the excessive mechanical vibration caused by the engine, will be so damped that the unit suspended is comparatively free of vibration. A novel type of vibration-proof suspension is shown in Figs. 1 and 2, wherein 10 designates one-half of a housing or base member which is ordinarily rigidly attached to the body of the aircraft, and 11 represents a unit such as a voltage regulator, from which it is desired to eliminate the major portion of the mechanical vibration existing in base member 10. For this reason, integral bosses 12 are cast or molded into base member 10, and have internal screw threads 13, within the housing or base member 10. Integral cylindrical shoulder portions 14 are formed inwardly in screw threads 13, and directly opposite each of the bosses 12, there is formed a recess 15 within the flange 16 of the housing of voltage regulator 11. Pin members, having cylindrical, rod-like shanks 17 terminating in screw-threaded heads 18 engaging with threads 13, project within recesses 15 to a point spaced from the bottom of recesses 15. Compressed between the shanks 17 and the bottom of the recesses, there are flexible plug members 19. Surrounding shanks 17, and snugly engaging the shanks, are tubular flexible members 20 that extend from the bottom of recesses 15, through shoulders 14 of bosses 12. Plugs 19 and flexible tubular members 20 may be formed of rubber or a rubber substitute, such as Neoprene or the like.

Base member 10 has the usual terminal board 21, to which are connected a plurality of conductors 22, from voltage regulator 11 for connection to an external circuit through the multiple conductors 23.

Quite often, the unit to be suspended, such as regulator 11, has appreciable weight, and for this reason, it is necessary that adequate mechanical suspension be provided. It will be noted that as long as shanks 17 extend within recesses 15, then the weight of unit 11 is borne by shanks 17, and members 20 are in simple compression. Resilience in the suspension is provided by means of tubular members 20 and plugs 19, as all motion of base 10 can be transmitted to flange 16 only through the rubber or other flexible material of members 19 and 20. Unit 11 may be loosely coupled or suspended from base 10 by making the compression of plugs 19 a minimum, that is, shanks 17 may be retracted by means of a screw driver or other suitable tool, so that lateral and longitudinal pressure between plug 19 and sleeve 20, and between plug 19 and the bottom of recesses 15, is a minimum.

Further, unit 11 may be more rigidly suspended by, or more tightly coupled to base 10 by advancing shanks 17 further into recesses 15, causing greater compression laterally and longitudinally of plugs 19.

The cylindrical shoulders 14, prevent tubular members 20 from buckling or warping when shanks 17 are advanced into recesses 15 and when thrusts are imparted to members 20 by lateral motion of unit 11. These shoulders also act to hold members 20 in proper alignment regardless of the axial position of screw-threaded heads 18 in bosses 12.

It will be seen that the weight of regulator 11 is carried by shanks 17 through a cushion of rubber provided by members 20. Shanks 17 may be of material such as aluminum, brass or steel, to support the mass of unit 11 without overload, and to transmit the load to housing 10. The great tensile strength of rubber or Neoprene in compression is thus utilized in order to provide a shock-proof mounting, with varying degrees of damping under the control of the operator installing the unit.

While only one embodiment of the present invention has been shown in the drawing, it is to be understood that various changes may be made without departing from the scope of the present invention. For this reason, it is intended not to limit the invention by the description herein given as an example, but solely by the scope of the appended claims.

I claim:

1. A vibration absorbing unit comprising in combination, a supporting base, a mechanism to be resiliently supported, a plurality of spaced, internally threaded members carried by said supporting base, a rod-like member having a threaded head in engagement with each of said members, a recessed portion in said mechanism opposite each of said threaded members, a flexible, tubular member extending into each of said recesses and over each of said rod-like members, and a plug of flexible, deformable material within each of said recesses, said plugs being laterally expanded into tight engagement with said tubular members.

2. A resilient suspension comprising in combination, a pin having a cylindrical shank and a head for engagement with a suitable base, a mechanism to be suspended having a housing, a cylindrical recess in said housing, a tubular, resilient member extending into said recess, said pin having its end projecting within said recess, and a plug within said recess under compression by said pin.

3. A resilient suspension comprising a base member, a mechanism to be suspended, said mechanism having a housing, an internally screw-threaded boss on said base, an integral, inwardly projecting shoulder having a circular aperture, a pin having a cylindrical shank and a screw-threaded head portion engageable with the threads of said boss, a recess in said housing, a resilient tubular member extending into said boss and into said recess and being of such external diameter that it fits snugly within said recess and said circular aperture, the diameter of said shank and the internal diameter of said member being so related that said tubular member snugly fits over said shank, and a plug of resilient material within said recess and under compression by said pin.

WILLIAM A. SCHRAK.